(12) United States Patent
Fujikura

(10) Patent No.: US 11,052,752 B2
(45) Date of Patent: Jul. 6, 2021

(54) COOLING APPARATUS

(71) Applicant: Toyota Jidosha Kabushiki Kaisha, Toyota (JP)

(72) Inventor: Keisuke Fujikura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

(21) Appl. No.: 16/663,878

(22) Filed: Oct. 25, 2019

(65) Prior Publication Data

US 2020/0130501 A1 Apr. 30, 2020

(30) Foreign Application Priority Data

Oct. 31, 2018 (JP) ................ JP2018-205314

(51) Int. Cl.
*B60K 11/08* (2006.01)
*B60K 11/06* (2006.01)

(52) U.S. Cl.
CPC ............ *B60K 11/085* (2013.01); *B60K 11/06* (2013.01)

(58) Field of Classification Search
CPC ........ B60K 11/08; B60K 11/085; B60K 11/06
See application file for complete search history.

(56) References Cited

U.S. PATENT DOCUMENTS

| | | | | |
|---|---|---|---|---|
| 9,103,265 B2* | 8/2015 | Okamoto | ................ | F01P 7/026 |
| 9,303,549 B2* | 4/2016 | Chellan | .................... | F01P 7/10 |
| 9,376,010 B2* | 6/2016 | Nam | ...................... | B60K 11/04 |
| 9,409,474 B2* | 8/2016 | Macfarlane | ............... | F01P 7/12 |
| 9,518,502 B2* | 12/2016 | Nam | ..................... | B60K 11/085 |
| 9,523,305 B2* | 12/2016 | Nam | ...................... | F01P 5/02 |
| 9,670,824 B2* | 6/2017 | Sowards | .................. | F01P 7/12 |
| 9,726,067 B2* | 8/2017 | Hakeem | ................ | F01M 13/00 |
| 9,840,144 B2* | 12/2017 | Aizawa | .................. | B60K 11/08 |
| 9,878,609 B2* | 1/2018 | Dudar | ...................... | F01P 7/02 |
| 9,950,612 B2* | 4/2018 | Miller | ...................... | F01P 7/12 |
| 9,994,100 B1* | 6/2018 | Del Gaizo | ............. | B60K 11/04 |
| 10,100,707 B2* | 10/2018 | Wolf | ......................... | F01P 7/10 |
| 10,216,258 B1* | 2/2019 | Hornback | ........... | B60H 1/3208 |
| 10,336,180 B2* | 7/2019 | Hussain | ................. | F01P 7/026 |
| 10,344,663 B2* | 7/2019 | Nam | ......................... | F01P 7/10 |
| 10,344,854 B2* | 7/2019 | Ogawa | ................. | B60K 11/085 |
| 10,350,990 B2* | 7/2019 | Moro | ...................... | F01P 11/10 |
| 10,364,735 B2* | 7/2019 | Macfarlane | .......... | B60K 11/085 |
| 10,464,412 B2* | 11/2019 | Dudar | ................. | B60K 11/085 |

(Continued)

FOREIGN PATENT DOCUMENTS

JP 2015-223905 A 12/2015

*Primary Examiner* — Jeffrey J Restifo
(74) *Attorney, Agent, or Firm* — Dinsmore & Shohl LLP

(57) ABSTRACT

A cooling apparatus for cooling compressed air produced by a compressor of a supercharger includes an air-cooled intercooler through which the compressed air flows, a grille shutter capable of blocking a flow of wind toward the intercooler, and a controller. The controller performs control processing to close the grille shutter when an ambient temperature around the intercooler is lower than or equal to zero degrees centigrade and a pressure value of the compressed air is lower than a predetermined pressure value at which condensate water generated within the intercooler is maintained in an unfrozen state at the ambient temperature lower than or equal to zero degrees centigrade, or otherwise performs control processing to open the grille shutter.

1 Claim, 3 Drawing Sheets

(56) References Cited

U.S. PATENT DOCUMENTS

| | | | | |
|---|---|---|---|---|
| 10,697,351 B2* | 6/2020 | Jolk | ............... | B60K 11/085 |
| 10,730,362 B2* | 8/2020 | Tilbury | ............ | B60H 1/00328 |
| 10,913,332 B2* | 2/2021 | Sato | ............... | B60K 11/085 |
| 2015/0343894 A1* | 12/2015 | Yoshioka | ............ | B60K 11/06 |
| | | | | 180/68.1 |

* cited by examiner

COOLING APPARATUS

CROSS REFERENCE TO RELATED APPLICATION

This application claims priority to Japanese Patent Application No. 2018-205314 filed on Oct. 31, 2018, which is incorporated herein by reference in its entirety including the specification, claims, drawings, and abstract.

TECHNICAL FIELD

The present disclosure relates to a cooling apparatus for cooling compressed air produced by a compressor in a supercharger.

BACKGROUND

Conventionally, superchargers have been utilized to enhance outputs from internal combustion engines of vehicles. Such a supercharger uses an exhaust gas flowing through an exhaust gas passage for driving a turbine in order to compress intake air by a compressor connected to the turbine. The compressed intake air (hereinafter, simply referred to as compressed air) is cooled by an intercooler and supplied to the internal combustion engine.

There are two types of intercoolers, one of which is an air-cooled type and the other of which is a water-cooled type. The intercooler of the air-cooled type (hereinafter, also referred to as an air-cooled intercooler) is installed, for example, in an engine compartment located on a front portion of the vehicle, and is configured to cool compressed air within the intercooler using travel wind which is introduced from an opening defined in a front region of the engine room and directed to the intercooler. Patent Document 1 discloses a technique for controlling a flow rate of travel wind introduced into the engine compartment.

CITATION LIST

Patent Literature

Patent Document 1: JP 2015-223905 A

When compressed air is cooled by the intercooler, vapor contained in the compressed air may condense to condensate water within the intercooler. Further, in a case where a vehicle equipped with the air-cooled intercooler travels through, for example, cold climate regions, cold travel wind impinging on the air-cooled intercooler may cause the condensate water within the air-cooled intercooler to be frozen therein. The frozen condensate water will narrow or block a passage (an intake passage) of the compressed air directed to an internal combustion engine, which may constitute a hindrance to operation of the engine. On the other hand, even during travel through the cold climate regions, if the temperature of the compressed air is high, it is necessary that the compressed air be cooled by a sufficient amount of travel wind impinging on the air-cooled intercooler.

It is therefore an object of the present disclosure to provide a cooling apparatus which can prevent freezing of condensate water generated within an air-cooled intercooler while securing a cooling capability of the air-cooled intercooler to cool compressed air produced by a compressor in a supercharger.

SUMMARY

A cooling apparatus according to the present disclosure is configured to cool compressed air which is produced by a compressor of a supercharger, and includes an air-cooled intercooler through which the compressed air flows, a grille shutter arranged forward of the intercooler and configured to interrupt a flow of wind onto the intercooler, a temperature sensor configured to detect an ambient temperature around the intercooler, a pressure sensor configured to detect a pressure value of the compressed air, and a controller configured to control opening and closing of the grille shutter, in which the controller performs control processing to close the grille shutter when both a condition that a detected value from the temperature sensor is lower than or equal to zero degrees centigrade and a condition that a detected value from the pressure sensor is lower than a predetermined pressure value at which condensate water generated within the intercooler is maintained in an unfrozen state at the ambient temperature having the detected value are satisfied, and performs control processing to open the grille shutter when at least either of the conditions is not satisfied.

In the cooling apparatus of the present disclosure, in a case where the ambient temperature around the air-cooled intercooler does not exceed zero degrees centigrade, and the compressed air has a pressure lower than the predetermined pressure value and thus has a lower temperature, there is a possibility that the condensate water generated in the air-cooled intercooler will be frozen. In this case, a wind flow onto the intercooler is blocked by the grille shutter, which can prevent freezing of the condensate water. In another case where the ambient temperature around the air-cooled intercooler exceeds zero degrees centigrade, or the compressed air has a pressure greater than or equal to the predetermined pressure value and accordingly has a higher temperature, there is no possibility that the condensate water generated within the air-cooled intercooler will be frozen. In the other case, the grille shutter is opened, which can ensure that the compressed air is appropriately cooled.

BRIEF DESCRIPTION OF DRAWINGS

An embodiment of the present disclosure will be described based on the following figures, wherein.

DESCRIPTION OF EMBODIMENTS

Figure 1:
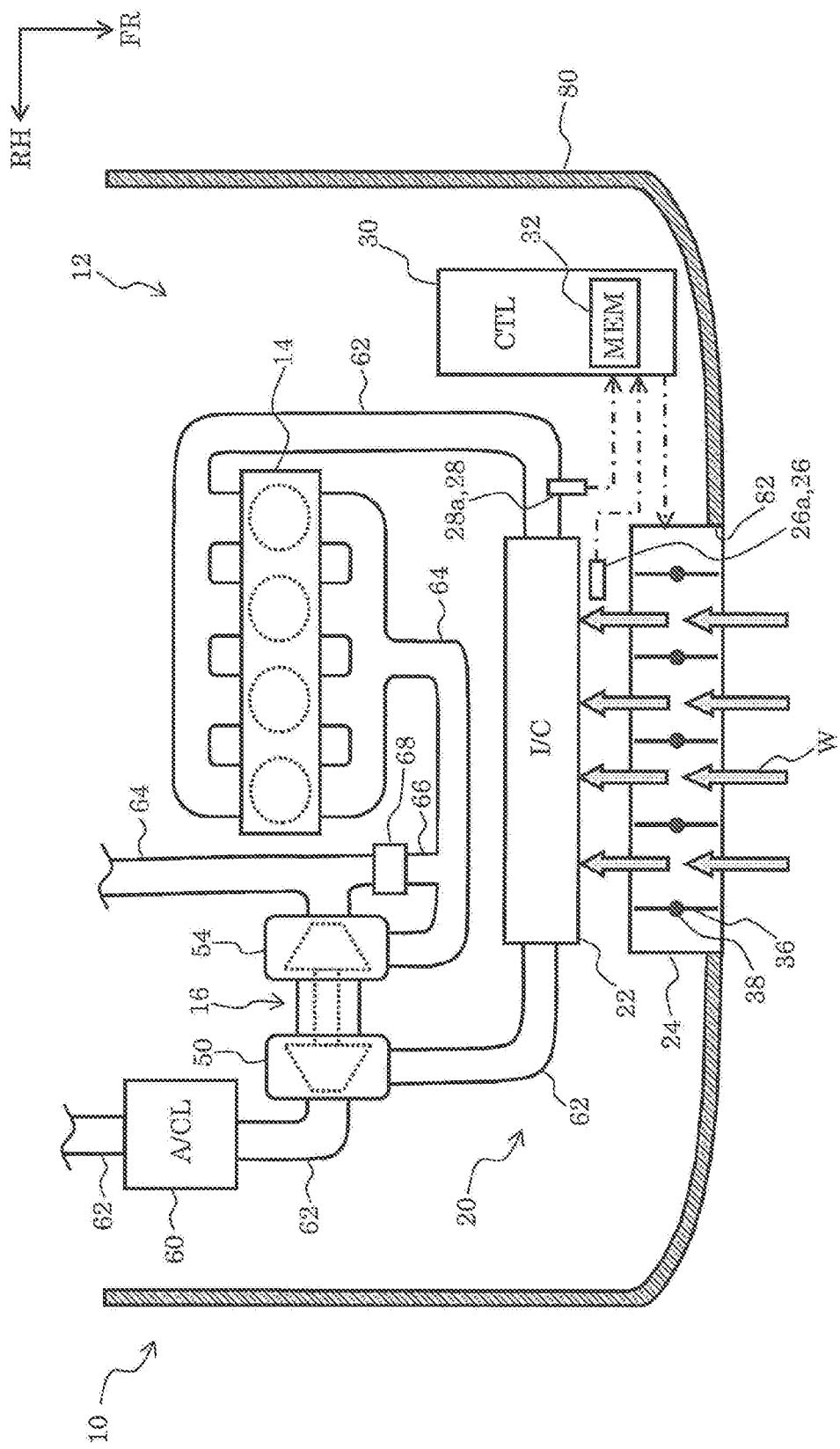
FIG. 1 is a schematic diagram showing a top view of an engine compartment of a vehicle in a state where a grille shutter is opened.

Hereinafter, an embodiment of a cooling apparatus according to the present disclosure will be described with reference to the drawings. In the following description, shapes and other features are explained by way of illustration, and may be modified or changed as appropriate depending on vehicle specifications. Identical or equivalent components are identified by identical reference numerals throughout the drawings, and descriptions related to these components will not be repeated. In the drawings, an arrow FR represents a front direction of the vehicle, and an arrow RH represents a right side direction of the vehicle.

FIG. 1 is a schematic diagram showing a top view of an engine compartment 12 of a vehicle 10. The engine compartment 12 disposed on a front portion of the vehicle 10 includes an internal combustion engine 14 connected to an intake passage 62 and an exhaust passage 64, a supercharger 16 for producing compressed air which is directed through the intake passage 62 to the internal combustion engine 14, and a cooling apparatus 20 disposed between the supercharger 16 and the internal combustion engine 14 in the intake passage 62 and configured to cool the compressed air from the supercharger 16.

The supercharger 16 is equipped with a compressor 50 arranged in the intake passage 62 and a turbine 54 arranged in the exhaust passage 64. When the turbine 54 is driven by an exhaust gas flowing through the exhaust passage 64, the compressor 50 connected to the turbine 54 is caused to compress intake air for producing compressed air.

In the intake passage 62, an air cleaner 60, the compressor 50 in the supercharger 16, and an air-cooled intercooler 22 for the cooling apparatus 20 are arranged in that order from an upstream side of the intake passage 62. Intake air introduced from a not-illustrated intake port is directed through the air cleaner 60 into the compressor 50 where the intake air is compressed and output as compressed air which is cooled through the air-cooled intercooler 22 and directed into the internal combustion engine 14. In a combustion chamber of the internal combustion engine 14, an air-fuel mixture of the compressed air and a fuel injected from a fuel injection valve (not illustrated) is burned to drive the internal combustion engine 14, and an exhaust gas obtained through combustion of the air-fuel mixture is discharged into the exhaust passage 64.

The exhaust passage 64 is equipped with the turbine 54 in the supercharger 16 and a bypass passage 66 for connecting an upstream side and a downstream side of the turbine 54. A waste gate valve 68 having an adjustable opening is arranged at some midpoint in the bypass passage 66. When a degree of opening of the waste gate valve 68 is increased, an amount of the exhaust gas directed to the bypass passage 66 becomes greater while an amount of the exhaust gas directed to the turbine 54 in the supercharger 16 becomes smaller, leading to a decrease in supercharging pressure of the compressor 50. Accordingly, the supercharging pressure (a pressure value of the compressed air) is controlled by adjusting the degree of opening of the waste gate valve 68. It should be noted that the degree of opening of the waste gate valve 68 is electrically adjusted by an electronic control unit (which is also referred to as an engine ECU) for controlling the internal combustion engine.

Next, the cooling apparatus 20 according to the present embodiment will be described in detail. The cooling apparatus 20 includes the air-cooled intercooler 22 through which the compressed air produced by the compressor 50 in the supercharger 16 flows, a grille shutter 24 disposed forward of the air-cooled intercooler 22 and configured to block a wind flow to the air-cooled intercooler 22, a temperature sensor 26 which detects an ambient temperature around the intercooler 22, a pressure sensor 28 which detects a pressure value of the compressed air, and a controller 30 which controls the grille shutter 24 to be opened or closed.

Figure 2:
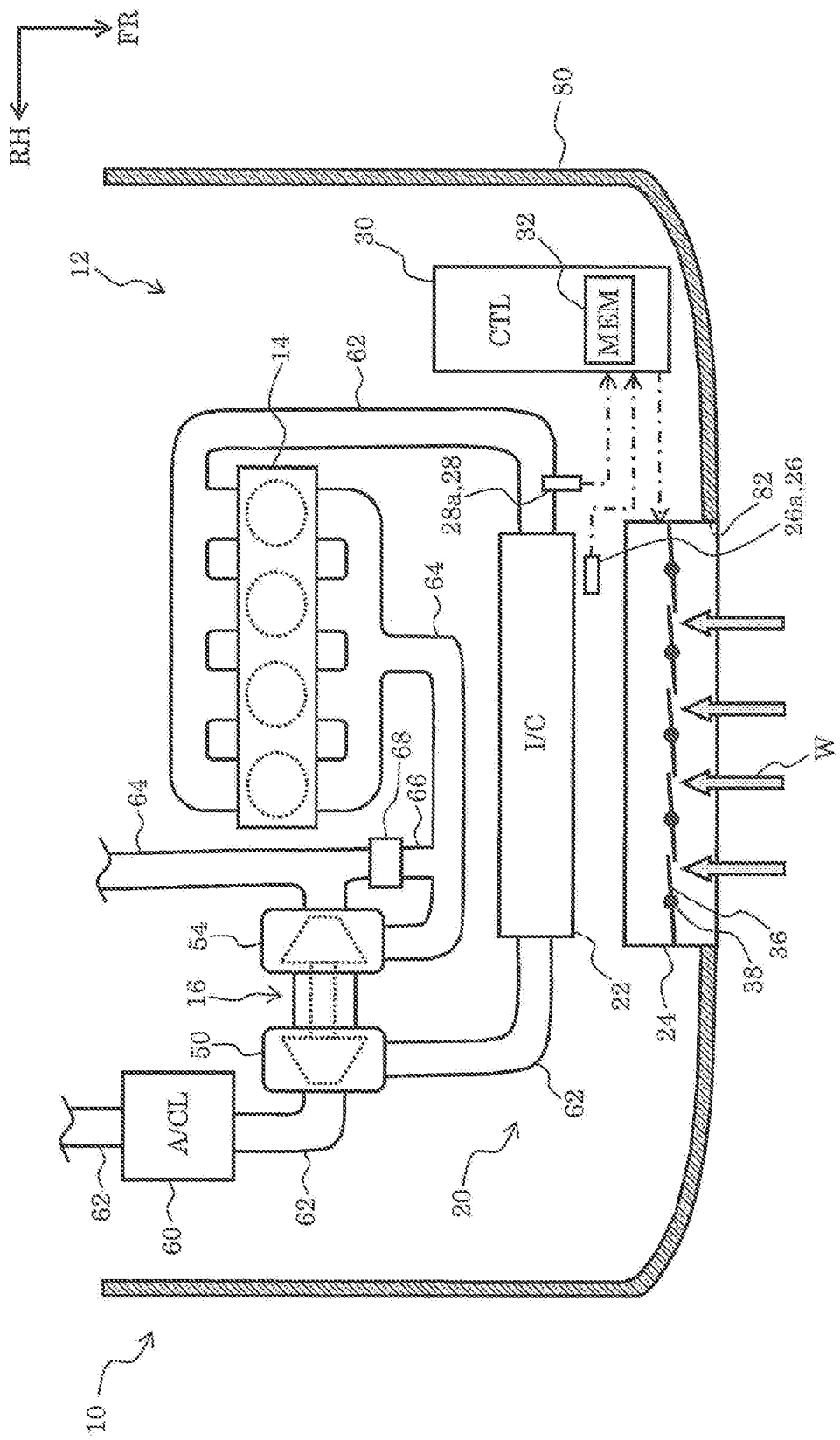
FIG. 2 is a schematic diagram showing the top view of the engine compartment of the vehicle in a state where the grille shutter is closed.

The grille shutter 24 is positioned in an opening 82 defined in a front surface of a body 80 of the vehicle 10, and is equipped with shielding plates 36 for blocking travel wind W which flows from ahead of the vehicle 10 toward the air-cooled intercooler 22, and rotation axes 38 to which the shielding plates 36 are fixed respectively. Rotation of each of the rotation axes 38 causes orientation of the respective shielding plate 36 to be changed between an open position in which the shielding plate 36 is positioned substantially in parallel to a vehicle longitudinal direction as shown in FIG. 1 and a closed position in which the shielding plate 36 is positioned substantially perpendicularly to the vehicle longitudinal direction as shown in FIG. 2. When the shielding plates 36 are in the open position as shown in FIG. 1, the travel wind W flows through space between the shielding plates 36 into the engine room 12 and impinges on the air-cooled intercooler 22, which enhances a cooling capability of the air-cooled intercooler 22. On the other hand, when the shielding plates 36 are in the closed position as shown in FIG. 2, the travel wind W is blocked by the shielding plates 36, and is accordingly prevented from entering the engine room 12 to impinge on the air-cooled intercooler 22, which reduces the cooling capability of the air-cooled intercooler 22. The grille shutter 24 further includes a not-illustrated actuator for driving the rotation axes 28, and the actuator is configured to operate in response to a control signal from the controller 30. It should be noted that a mechanism to open and close the grille shutter 24 is not limited to the above-described structure, and may be of any structure capable of switching between operations of allowing the wind flow to the air-cooled intercooler 22 and preventing the wind flow to the air-cooled intercooler 22.

The temperature sensor 26 includes a temperature detecting unit 26a which is arranged inside the engine compartment 12 at a position close to the air-cooled intercooler 22 to detect an ambient temperature around the air-cooled intercooler 22. In this embodiment, the temperature detecting unit 26a is placed on a front side of the air-cooled intercooler 22. The ambient temperature around the air-cooled intercooler 22 (a detected value) obtained by the temperature sensor 26 is output to the controller 30.

The pressure sensor 28 includes a pressure detecting unit 28a which is arranged in the intake passage 62 on a downstream side of the compressor 50 of the supercharger 16 to detect a pressure value of the compressed air. In this embodiment, the pressure detecting unit 28a of the pressure sensor 28 is placed downstream from the air-cooled intercooler 22 in the intake passage 62. The pressure value (detected value) of the compressed air obtained by the pressure sensor 28 is output to the controller 30.

The controller 30 is an electronic control unit (ECU) configured as a computer, and may be implemented by the engine ECU or by an independent ECU separated from the engine ECU. The controller 30 includes a memory 32 for storing control parameters, and the memory 32 is, for example, a RAM, a ROM, or a flash memory. The controller 30 receives inputs of the detected value from the temperature sensor 26 and the detected value from the pressure sensor 28, generates either of control signals indicative of operations to open and close the grille shutter 24 based on both the received detected values and the control parameters stored in the memory 32, and outputs the generated control signal to the grille shutter 24.

Figure 3:
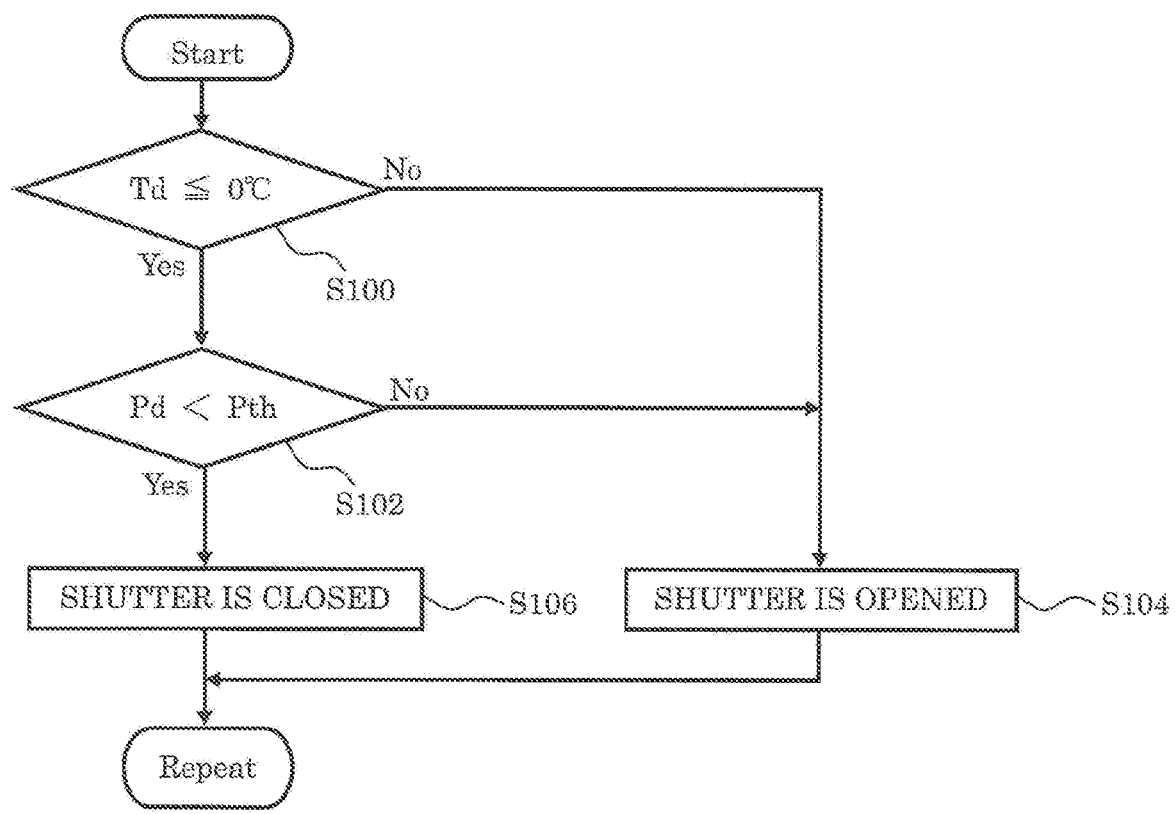
FIG. 3 is a flowchart showing a flow of steps in control operation to open and close the grille shutter.

Next, control operations to open and close the grille shutter 24 of the cooling apparatus 20 in this embodiment will be described. The controller 30 performs control operation to open or close the grille shutter 24 for the purpose of switching between the operations of allowing and preventing the travel wind W toward the air-cooled intercooler 22 to thereby change the cooling capability of the air-cooled intercooler 22. This can prevent the condensate water generated within the air-cooled intercooler 22 from being frozen while securing coolability of the compressed air flowing through the air-cooled intercooler 22. FIG. 3 is a flowchart showing a flow of process steps performed by the controller 30 to control opening and closing of the grille shutter 24. The controller 30 performs processing in the process steps shown in FIG. 3 at a predetermined cycle tc.

Firstly, in step S100, the controller 30 compares a detected value Td from the temperature sensor 26 with a threshold temperature of 0° C. which is one of the control parameters stored in the memory 32, to determine whether or not the detected value Td is lower than or equal to 0° C. This is a determination for finding whether or not there is a possibility that the condensate water generated in the air-cooled intercooler 22 will be frozen due to the ambient temperature around the air-cooled intercooler 22 being lower than or equal to 0° C.

When the detected value Td from the temperature sensor 26 is not determined to be lower than or equal to 0° C. in step S100 (when no is determined in step S100), operation advances to step S104. In step S104, the controller 30 outputs to the grille shutter 24 the control signal indicative of "opening" in order to open the grille shutter 24. In this way, when there is no possibility that the condensate water generated in the air-cooled intercooler 22 will be frozen, the grille shutter 24 is opened for allowing the travel wind W to impinge on the air-cooled intercooler 22 in order to enhance the cooling capability of the air-cooled intercooler 22. As a result, the compressed air can be cooled sufficiently. After the processing in step S104 is complete, operation in this cycle is terminated.

On the other hand, when the detected value Td from the temperature sensor 26 is determined to be lower than or equal to 0° C. in step S100 (when yes is determined in step S100), operation advances to step S102. In step S102, the controller 30 compares the detected value Pd from the pressure sensor 28 with a threshold pressure Pth, which is another one of the control parameters stored in the memory 32, to determine whether or not the detected value Pd is smaller than the threshold pressure Pth. The threshold pressure Pth is a predetermined pressure value at which the condensate water generated in the air-cooled intercooler 22 is maintained in an unfrozen state under a condition that the ambient temperature around the air-cooled intercooler 22 is lower than or equal to 0° C. When the supercharging pressure (the pressure of the compressed air) from the supercharger 16 becomes higher, the temperature of the compressed air is accordingly increased, which allows the condensate water within the air-cooled intercooler 22 to be maintained in the unfrozen state even under the condition that the ambient temperature of the air-cooled intercooler 22 is lower than or equal to 0° C. For this reason, whether or not there is the possibility that the condensate water generated in the air-cooled intercooler 22 will be frozen is determined with reference to the threshold pressure Pth in step S102. The threshold pressure Pth may be previously determined, for example, by an experiment to find a pressure at which the condensate water is frozen, while gradually changing the supercharging pressure under the condition that the ambient temperature around the air-cooled intercooler 22 is maintained at the value lower than or equal to 0° C., and stored in the memory 32.

When the detected value Pd from the pressure sensor 28 is not determined to be smaller than the threshold pressure Pth in step S102 (when no is determined in step S102); i.e., when the detected value Pd is greater than or equal to the threshold pressure Pth, operation proceeds to step S104. In step S104, the controller 30 outputs to the grille shutter 24 the control signal indicative of "opening" in order to open the grille shutter 24. When the pressure value Pd of the compressed air matches or exceeds the threshold pressure Pth, because the compressed air has a higher temperature, there is no possibility that the condensate water within the air-cooled intercooler 22 will be frozen even at the ambient temperature of the air-cooled intercooler 22 lower than or equal to 0° C. On the other hand, due to the higher temperature of the compressed air, it becomes necessary that the compressed air should be cooled sufficiently. For this reason, the grille shutter 24 is opened to thereby direct the travel wind W to the air-cooled intercooler 22 for the purpose of enhancing the cooling capability of the air-cooled intercooler 22. This allows the compressed air to be sufficiently cooled. After the processing in step S104 is complete, operation in this cycle is terminated.

On the other hand, when the detected value Pd from the pressure sensor 28 is determined to be lower than the threshold pressure Pth in step S102 (when yes is determined in step S102), operation advances to step S106. In step S106, the controller 30 outputs to the grille shutter 24 the control signal indicative of "closing" in order to close the grille shutter 24. When the pressure value Pd of the compressed air is lower than the threshold pressure Pth, the compressed air has a lower temperature, which raises the possibility that the condensate water within the air-cooled intercooler 22 will be frozen. For this reason, the grille shutter 24 is closed to thereby prevent the travel wind W from impinging on the air-cooled intercooler 22 for the purpose of reducing the cooling capability of the air-cooled intercooler 22. In this way, it can be prevented that the condensate water within the air-cooled inter cooler 22 is frozen. After the processing in step S106 is complete, operation in this cycle is terminated. The controller 30 performs processing in the above-described process steps of the flow shown in FIG. 3 at the predetermined cycle tc, to maintain the grille shutter 24 in an optimum opened or closed state.

Next, an effect of the cooling apparatus 20 in this embodiment will be described. According to the cooling apparatus 20 of this embodiment, when there is the possibility that the condensate water generated in the air-cooled intercooler 22 will be frozen because the ambient temperature Td around the air-cooled intercooler 22 is lower than or equal to 0° C. (the melting point of water) and the compressed air has a lower temperature due to the pressure value Pd of the compressed air smaller than the predetermined threshold pressure Pth, the grille shutter 24 is operated to interrupt the travel wind W toward the air-cooled intercooler 22. As a result, the cooling capability of the air-cooled intercooler 22 is reduced, which can prevent freezing of the condensate water in the air-cooled intercooler 22.

Meanwhile, when there is no possibility that the condensate water generated in the air-cooled intercooler 22 will be frozen because the ambient temperature Td around the air-cooled intercooler 22 is higher than 0° C., or because the compressed air has a higher temperature due to the pressure value Pd of the compressed air greater than or equal to the predetermined threshold pressure Pth, the grille shutter 24 is opened to direct the travel wind W toward the air-cooled intercooler 22. This can increase the cooling capability of the air-cooled intercooler 22, to thereby sufficiently cool the compressed air. In this way, it becomes possible to prevent freezing of the condensate water generated in the air-cooled intercooler 22 while ensuring that the compressed air is appropriately cooled.

The invention claimed is:

1. A cooling apparatus for cooling compressed air produced by a compressor of a supercharger, the cooling apparatus comprising:
   an air-cooled intercooler through which the compressed air flows;

a grille shutter disposed forward of the intercooler and configured to block a flow of wind toward the intercooler;
a temperature sensor configured to detect an ambient temperature around the intercooler;
a pressure sensor configured to detect a pressure value of the compressed air; and
a controller configured to control the grille shutter to be opened or closed,
wherein the controller performs control processing to close the griller shutter when both a condition that a detected value from the temperature sensor is lower than or equal to zero degrees centigrade and a condition that a detected value from the pressure sensor is smaller than a predetermined pressure value at which condensate water generated within the intercooler is maintained in an unfrozen state at the ambient temperature of the detected value are satisfied, and performs control processing to open the grille shutter when at least either of the conditions is not satisfied.

* * * * *